US 6,697,124 B2

(12) United States Patent
Dimitrova et al.

(10) Patent No.: US 6,697,124 B2
(45) Date of Patent: Feb. 24, 2004

(54) SMART PICTURE-IN-PICTURE

(75) Inventors: Nevenka Dimitrova, Yorktown Heights, NY (US); Angel Janevski, New York City, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 371 days.

(21) Appl. No.: 09/822,456

(22) Filed: Mar. 30, 2001

(65) Prior Publication Data

US 2002/0140862 A1 Oct. 3, 2002

(51) Int. Cl.⁷ .................................................. H04N 5/45
(52) U.S. Cl. ........................................ 348/565; 348/567
(58) Field of Search ................................ 348/565–568, 348/588, 584

(56) References Cited

U.S. PATENT DOCUMENTS

| 4,367,484 A | * | 1/1983 | Kuroyanagi et al. | ........ 348/565 |
| 4,682,234 A | * | 7/1987 | Naimpally | .................. 348/565 |
| 4,712,130 A | * | 12/1987 | Casey | ......................... 348/565 |
| 5,202,765 A | * | 4/1993 | Lineberry | .................... 348/565 |
| 5,455,632 A | * | 10/1995 | Ichihara | ...................... 348/565 |
| 6,008,860 A | | 12/1999 | Patton et al. | ................ 348/565 |

FOREIGN PATENT DOCUMENTS

| DE | 19843919 A | 3/2000 | ............ H04N/5/45 |
| EP | 0849722 A2 | 6/1998 | ............ G09G/5/36 |
| EP | 1158788 A1 | 11/2001 | .......... H04N/5/265 |
| JP | 07087392 A | 3/1995 | .......... H04N/5/272 |
| JP | 07162831 A | 6/1995 | ............ H04N/7/15 |
| JP | 10200873 A | 7/1998 | ............ H04N/7/15 |

OTHER PUBLICATIONS

"Omni–Face Detection for Video–Image Content Description" by Gang Wei and Ishwar K. Sethi.

* cited by examiner

Primary Examiner—Victor R. Kostak

(57) ABSTRACT

In a television receiver having Picture-In-Picture (PIP), a controller analyzes the content of a video signal forming a main picture, and automatically adjusts the size and position of a PIP image to correspond to regions of the main picture exhibiting the least amount of motion, texture, and/or a repeating texture. The controller also prevents the PIP image from being positioned over text or faces or other important objects in the main picture.

7 Claims, 3 Drawing Sheets

SMART PICTURE-IN-PICTURE

BACKGROUND OF THE INVENTION

1. Field of the Invention

The subject invention relates to television receivers having the capability of displaying Picture-In-Picture (PIP).

2. Description of the Related Art

PIP is a feature in a television receiver in which the picture from a video signal in a main channel fills the display, while the picture from a video signal in an auxiliary channel is sub-sampled and overlays a portion of the main picture on the display. This enables a user of the television receiver to monitor the video signal from an alternate source, e.g., a television channel from a second tuner, the signal from a video cassette recorder or a video camera, etc.

However, when displaying the PIP signal, a portion of the main picture is lost. Depending on the content of the main picture, the area occupied by the PIP picture may obscure an important portion of the main picture, for example, in sports, this important portion may be that devoted to displaying the current score, while in a movie, this portion may be that devoted to displaying the faces of the leading characters.

In order to alleviate this problem, it is known to be able to move the PIP picture to various different positions under control of the user, to reposition the PIP picture such that it does not obscure an important information of the main picture.

U.S. Pat. No. 6,008,860 discloses circuitry with which the size of the PIP picture may be selectively reduced to further obscure less of the main picture.

In each of the above arrangements, it is up to the user to determine when such important information is being obscured and to take the corrective action, i.e., reducing the size of the PIP picture or moving the PIP picture, or both.

SUMMARY OF THE INVENTION

It is an object of the present invention to provide a television receiver having a PIP capability in which the size and position of the PIP picture are adjusted automatically in dependence on the content of the main picture.

The above object is achieved in a television receiver having a picture-in-picture (PIP) functionality, said television receiver comprising a main video path including an input for receiving a main video signal, and a main signal video processing circuit for processing the main video signal in the main video path; an auxiliary video path including an auxiliary input for receiving an auxiliary video signal, and an auxiliary signal video processing circuit for sub-sampling and processing the auxiliary video signal in the auxiliary video path; a display for displaying video signals; and means for selectively applying processed main video signal and the sub-sampled auxiliary video signal to the display such that a picture from the sub-sampled auxiliary video signal overlies a portion of a picture from the main video signal, wherein said selectively applying means comprises means for detecting and analyzing characteristics of the main video signal; and means for changing attributes of the PIP picture in response to said detected and analyzed characteristics of the first video signal.

Applicants have determined that by analyzing the main video signal, regions in the picture frame may be found which contain relatively unimportant information. These regions may be identified by examining motion and texture, wherein regions having relatively no motion, the least texture, i.e., having a single color, or having a repeated texture, may be candidates for the positioning of the PIP image. Based on the size and positioning of these candidate regions, the size and positioning of the PIP image may be changed to coincide with that of one of the candidate regions.

BRIEF DESCRIPTION OF THE DRAWINGS

With the above objects and advantages in mind as will hereinafter occur, the subject invention will be described with reference to the accompanying drawings, in which.

DESCRIPTION OF THE PREFERRED EMBODIMENTS

Figure 1:
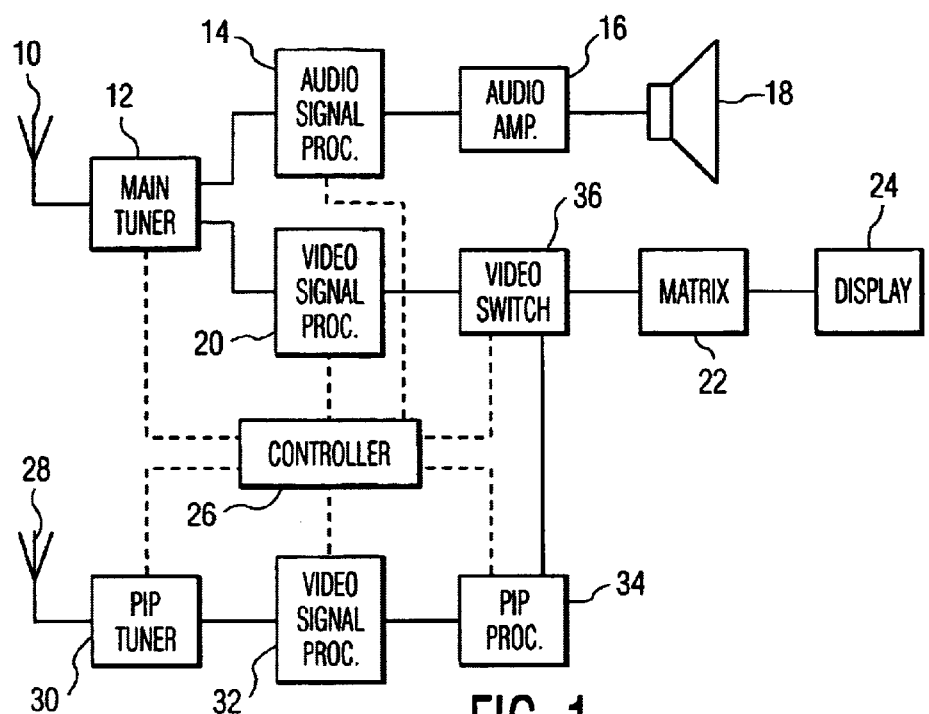
FIG. 1 shows a schematic block diagram of a known television receiver having the PIP function.

As shown in FIG. 1, a television receiver typically includes an input for receiving television signals. This is shown as an antenna 10 connected to a tuner 12. One output of the tuner 12 carries an audio portion of the television signal which is applied to an audio signal processing circuit 14 which, in turn, applies the audio signal to an audio amplifier 16 for amplification and then to a loudspeaker 18. Another output of the tuner 12 carries a video portion of the television signal which is applied to a video signal processing circuit 20 which, in turn, applies the video signal to a matrix circuit 22 for generating the color signals red (R), green (G) and blue (B), which are applied to a display 24. A controller 26, which may include a microprocessor, is connected to control inputs of the tuner 12, the audio signal processing circuit 14, and the video signal processing circuit 20, for tuning to the desired television program, and for controlling the audio and video signal processing.

In the case of Picture-In-Picture (PIP), the television receiver includes an input for an auxiliary television signal, which in this case is shown as a second antenna 28 and a second tuner 30. A second video signal processing circuit 32 is connected to the output of the tuner 30 and provides a processed video signal to a PIP processor 34. The PIP processor 34 sub-samples the processed video signal and applies the sub-sampled video signal to one input of a video switch 36 arranged between the video signal processing circuit 20 and the display 24. The controller 26 is coupled to control inputs of the second tuner 30, the second video signal processing circuit 32, the PIP processor 34 and the video switch 36, for choosing the television program for the PIP, for controlling the processing of the auxiliary video signal, and for controlling the sub-sampling in the PIP processor 34 and the switching of the video switch 36 for controlling the size and position of the PIP image. In this prior art television receiver, if the PIP image obscures an important portion of the main picture, the user must take action, i.e., reduce the size of the PIP image, or move the PIP image to, for example, another of a plurality of pre-assigned regions on the display.

Figure 2:
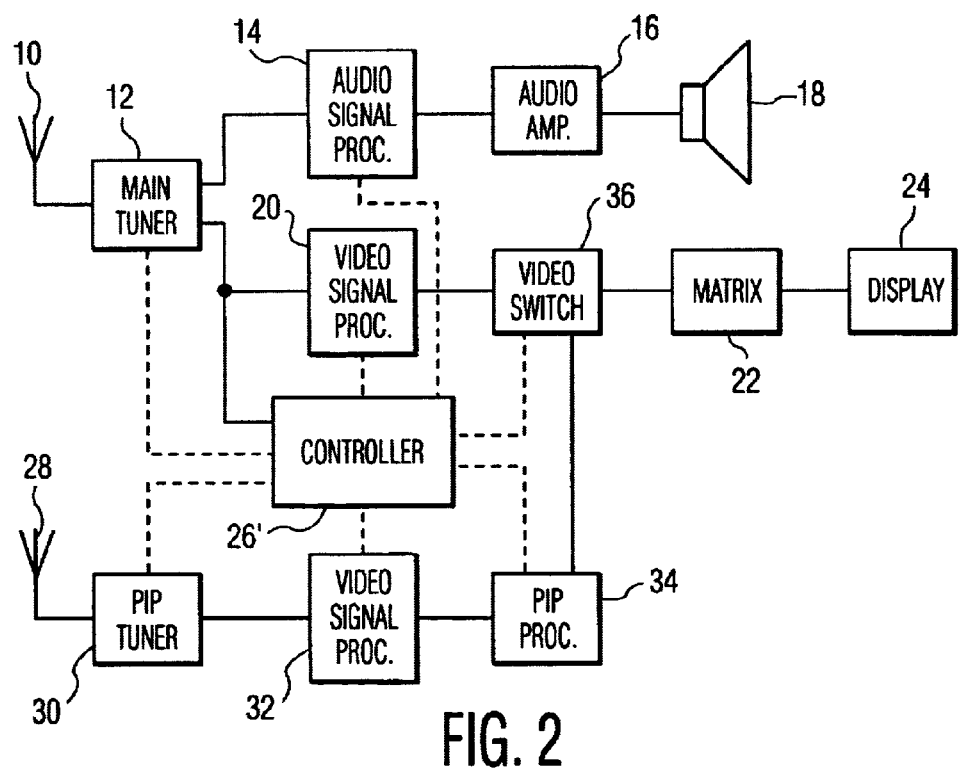
FIG. 2 shows a schematic block diagram of a television receiver in accordance with the subject invention.

FIG. 2 shows a block diagram of the television receiver incorporating the subject invention. It should be apparent that this television receiver is substantially similar to that shown in FIG. 1, with the exception that the video signal from the tuner 12 is additionally applied to the controller 26'. The controller 26' includes means for analyzing the content of the video signal for detecting regions of a display resulting from the video image that exhibit the least amount of motion, the least texture, i.e., having a single color, and/or having a repeated texture, i.e., tiles of a texture. This may be done by any known method. For example, U.S. patent application Ser. No. 09/477,084, filed Dec. 30, 1999 (Attorney Docket PHA 23,938), discloses a method of detecting fast motion scenes in a video signal. Once the video signal has been analyzed and the candidate regions identified, the controller 26' performs an algorithm described with reference to FIG. 3.

Figure 3:
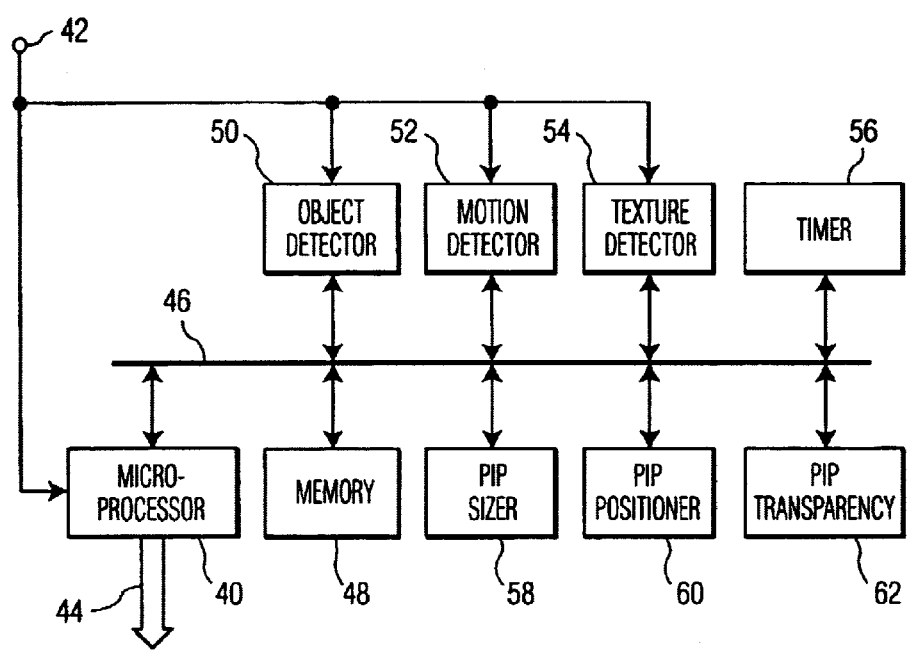
FIG. 3 shows a block diagram of a controller for use in the television receiver of FIG. 2.

FIG. 3 shows a block diagram of the controller 26' of FIG. 2. In particular, the main video signal from the main tuner 12 is applied to an input 42 of a microprocessor 40, which applies control signals to the various components in the television receiver via control signal outputs 44. The microprocessor 40 communicates via a bus 46 with a memory 48. An object detector 50, motion detector 52 and texture detector 54 are also coupled to the input 42 for receiving the main video signal, and communicate with the microprocessor 40 via the bus 46. A timer 56 is additional provided and is also coupled to the bus 46. A PIP sizer 58, PIP positioner 60 and PIP transparency adjuster 62 are provided for controlling the attributes of the PIP image, and are connected to the microprocessor 40 via the bus 46. While separate means have been shown for performing the various functions of the controller 26', it should be understood that these function may be performed by appropriate software programming stored in the memory 48 and operated upon by the microprocessor 40.

Figure 4:
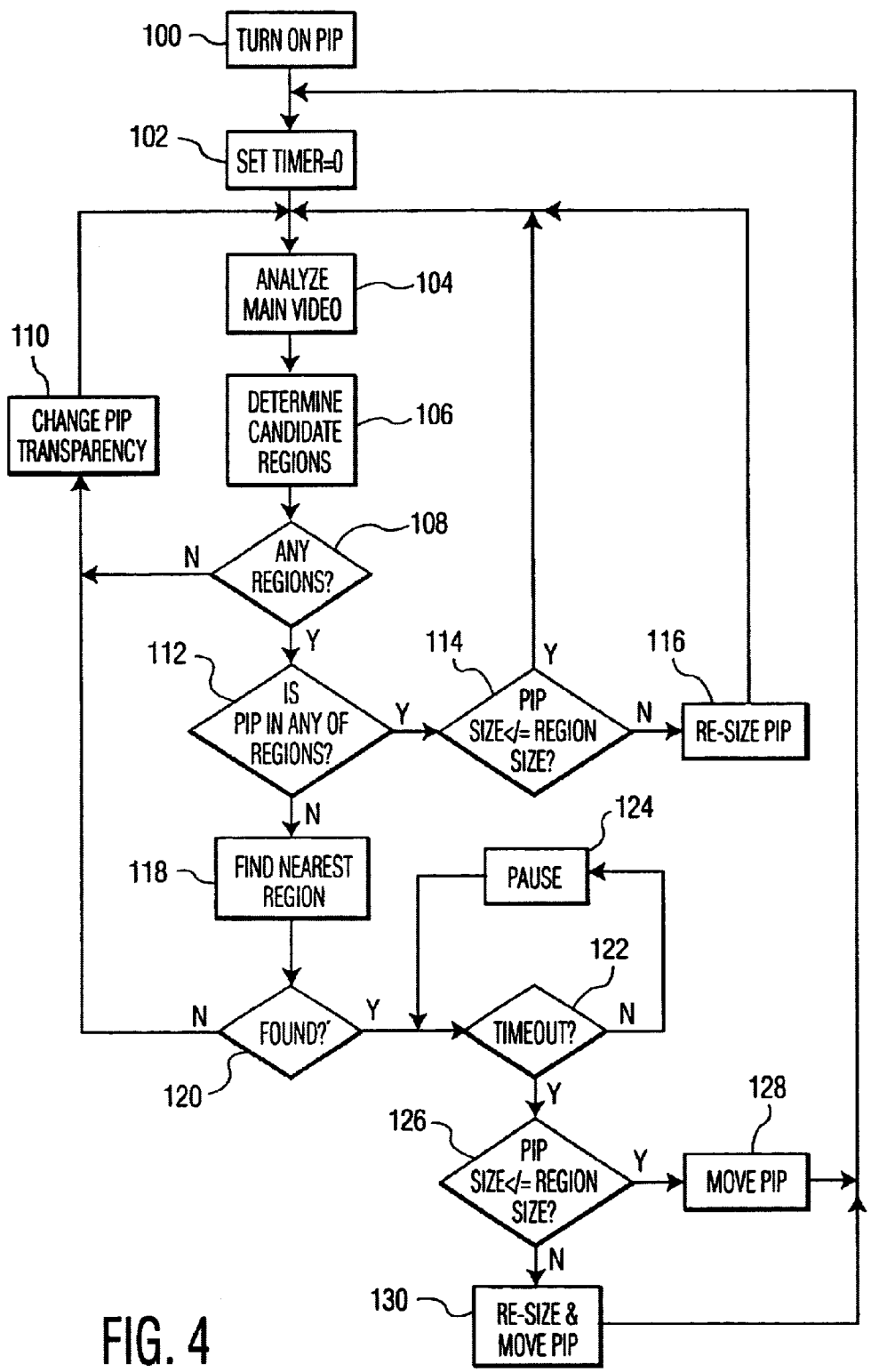
FIG. 4 shows a flowchart describing the operation of the invention.

FIG. 4 shows a flowchart describing the algorithm performed by the controller 26' in implementing the Smart PIP of the subject invention. In particular, at step 100, the user turns on the PIP function and the PIP image is displayed at a pre-set size and position. At step 102, the controller 26' sets a timer to 0. The controller 26', at step 104, analyzes the main video signal. At step 106, regions Rn are identified having the least motion, the least texture, and/or a repeated texture. At step 108, the controller 26' determines whether any regions Rn have been determined. If not, the controller 26', at step 110, changes the transparency of the PIP image and reverts to step 104. The transparency of the PIP image is changed such that the main picture is more visible through the PIP image. The changing of the transparency of the PIP image may be performed in one or a plurality of steps.

If, at step 108, the controller 26' determines candidate regions Rn, then, at step 112, the controller 26' determines whether the current position of the PIP image coincides with one of the regions Rn. If so, the controller 26' determines, at step 114, whether the current PIP size is the same size or smaller than the selected region. If so, the controller 26' reverts back to step 104, and if not, the controller 26' resizes the PIP image at step 116 and then reverts to step 104. If, at step 110, the current PIP position is different from any of the identified regions, the controller 26', at step 118, attempts to find one of the identified regions which is nearest to the current PIP image position. At step 120 the controller 26' determines whether such a region has been found and, if not, the controller 26' reverts to step 110 and changes the transparency of the PIP image. If such a region is found, the controller 26' checks whether the current value in the timer exceeds a threshold "TIMEOUT" at step 122. If not, the controller 26' pauses for a predetermined amount of time at step 124 and rechecks the timer value at step 122. Once the timer value exceeds TIMEOUT, at step 126, the controller 26' determines whether the PIP size is less than or equal to the size of the nearest region. If so, the controller 26', at step 128, moves the PIP to the closest region and reverts to step 102, resetting the timer to 0. If not, the controller 26', at step 130, resizes the PIP image and, in addition, moves the PIP to the closest region, then reverting to step 102.

In implementing the analyzing of the video signal, it may be desired to restrict the potential regions for locating the PIP image such that the image is not placed over text or over faces greater than a particular size or over "important objects." For example, in a sports broadcast, the current score may be shown in a particular position on the screen and should not be covered by the PIP image. U.S. patent application Ser. No. 09/370,931, filed Aug. 9, 1999 (Attorney Docket No. PHA 23,616) discloses a method and apparatus for detecting such text in a video signal. This may be incorporated in the controller 26' such that any text in the main video signal, i.e., the score in a sporting event, may be detected and is not be overlaid by the PIP image. In, for example, figure skating, it is important not to place the PIP image over the person who is competing. Normally, if there is camera motion (unless the camera is panning), the camera is following an object of interest, i.e., the person. In such cases, the central regions in general are more important than the peripheral regions. Hence, the central regions are less suitable for PIP image overlay.

Similarly, the article "OMNI-FACE DETECTION FOR VIDEO/IMAGE CONTENT DESCRIPTION" by G. Wei and I. K. Sethi, International Workshop on Multimedia Information Retrieval, ACM Multimedia Conference 2000 (MIR2000), describes a method and apparatus for detecting faces in a video signal. Again, the features of this article may be incorporated into the controller 26' to prevent the controller 26' from positioning the PIP image over the face of the figure skater.

Up to this point, the subject invention has only addressed the size, positioning and transparency of the PIP image, while the shape of the PIP image has stayed as that of a standard television picture. However, it should be understood that, in addition, The controller 26' may be pre-programmed with alternative shapes for the PIP image, for example, oval, round, trapezoidal, etc. In that event, if, for example, the controller 26' is not able to determine candidate regions, the controller 26' may, instead of or in addition to changing the transparency of the PIP image, change the shape of the PIP image to one of the alternative shapes.

Numerous alterations and modifications of the structure herein disclosed will present themselves to those skilled in the art. However, it is to be understood that the above described embodiment is for purposes of illustration only and not to be construed as a limitation of the invention. All such modifications which do not depart from the spirit of the invention are intended to be included within the scope of the appended claims.

What is claimed is:

1. A television receiver having a picture-in-picture (PIP) functionality, said television receiver comprising:
   a main video path including an input for receiving a main video signal, and a main video signal processing circuit for processing the main video signal in the main video path;
   an auxiliary video path including an auxiliary input for receiving an auxiliary video signal, and an auxiliary video signal processing circuit for sub-sampling and processing the auxiliary video signal in the auxiliary video path;

a display for displaying video signals; and means for selectively applying the processed main video signal and the sub-sampled auxiliary video signal to the display such that an image from the sub-sampled auxiliary video signal forms a PIP image and overlies a portion of an image from the processed main video signal, wherein said selectively applying means comprises:

means for detecting and analyzing characteristics of the main video signal; and means for changing attributes of the PIP image in response to said detected and analyzed characteristics of the main video signal, wherein said attributes of the PIP image include size, shape, position and transparency.

2. The television receiver as claimed in claim 1, wherein said attributes changing means gradually changes said attributes over a predetermined period of time.

3. A television receiver having a picture-in-picture (PIP) functionality, said television receiver comprising:

a main video path including an input for receiving a main video signal, and a main video signal processing circuit for processing the main video signal in the main video path;

an auxiliary video path including an auxiliary input for receiving an auxiliary video signal, and an auxiliary video signal processing circuit for sub-sampling and processing the auxiliary video signal in the auxiliary video path;

a display for displaying video signals; and means for selectively applying the processed main video signal and the sub-sampled auxiliary video signal to the display such that an image from the sub-sampled auxiliary video signal forms a PIP image and overlies a portion of an image from the main video signal, wherein said selectively applying means comprises:

means for detecting and analyzing characteristics of the main video signal; and means for changing attributes of the PIP image in response to said detected and analyzed characteristics of the main video signal, wherein said characteristics include motion, texture and content.

4. The television receiver as claimed in claim 3, wherein said content includes faces of persons, text, and cuts.

5. The television receiver as claimed in claim 3, wherein said detecting and analyzing means detects regions in the main video signal where the PIP image should not be positioned.

6. The television receiver as claimed in claim 5, wherein said regions constitute text, objects and/or persons followed by a camera in generating the main video signal.

7. A television receiver having a picture-in-picture (PIP) functionality, said television receiver comprising:

a main video path including an input for receiving a main video signal, and a main video signal processing circuit for processing the main video signal in the main video path;

an auxiliary video path including an auxiliary input for receiving an auxiliary video signal, and an auxiliary video signal processing circuit for sub-sampling and processing the auxiliary video signal in the auxiliary video path;

a display for displaying video signals; and means for selectively applying the processed main video signal and the sub-sampled auxiliary video signal to the display such that an image from the sub-sampled auxiliary video signal forms a PIP image and overlies a portion of an image from the main video signal, wherein said selectively applying means comprises:

means for detecting and analyzing characteristics of the main video signal; and means for changing attributes of the PIP image in response to said detected and analyzed characteristics of the main video signal, wherein said television receiver further comprises:

At least one additional video path, including an additional input for receiving an additional video signal, and an additional video signal processing circuit for sub-sampling and processing the additional video signal in the additional video path, for providing at least one sub-sampled additional video signal, wherein said selectively applying means selectively applies said at least one additional sub-sampled video signal to the display in addition to said processed main video signal and said sub-sampled auxiliary video signal.

* * * * *